United States Patent [19]
Serra et al.

[11] Patent Number: 5,630,114
[45] Date of Patent: May 13, 1997

[54] DATABASE MANAGEMENT SYSTEM EMBEDDED IN AN OPERATING SYSTEM COMMAND

[76] Inventors: Bill Serra, 4043 Park Blvd., Palo Alto, Calif. 94306; Antoni Drudis, 19523 Miller Ct., Saratoga, Calif. 95070

[21] Appl. No.: 7,463

[22] Filed: Jan. 22, 1993

[51] Int. Cl.$^6$ .................................................. G06F 17/30
[52] U.S. Cl. ...................... 395/603; 364/280; 364/282.1; 364/283.1; 364/DIG. 1; 395/611
[58] Field of Search ............................................. 395/600

[56] References Cited

U.S. PATENT DOCUMENTS

| | | | |
|---|---|---|---|
| 3,670,310 | 6/1972 | Bhamrwamr | 364/200 |
| 4,791,554 | 12/1988 | Hirota et al. | 395/600 |
| 5,398,335 | 3/1995 | Lewis | 395/600 |

OTHER PUBLICATIONS

Neuhaus, T., "Databases", PC Magazine, vol. 9, No. 14, p. 447 (3) Aug. 1990.

Christian, K., The Unix Operating System, John wiley and Sons, Inc., pp. 290–301. Note aditional pages to a previously cited reference 1983.

Christian, *The UNIX Operating System*, 1983 p. 100 –Note This Is An Additional Page Of A Previously Cited Reference.

Elmasri et al, *Fundamentals Of Database Systems*, 1989, pp. 71–83, Benjamin/Cummings Publ.

Rash, "Query!$^2$ Low–Cost, High–Quality, Data Management" Interface Age –May 1984. pp. 116–117.

Dasgupta et al, "The Clouds Distributed Operating System; Functional Discription, Implementation Details and Related Work" 1988 IEEE pp. 2–9.

Christian, *The UNIX Operating System* 1983 pp. 101–102 and 175–178. Publi John Wiley & Sons.

Duncan "Managing Random Access Files, PC–Magazine", Mar. 28, 1989, pp. 291–292 and 295–296 and 300 & 301–302.

*Primary Examiner*—Thomas G. Black
*Assistant Examiner*—Jack M. Choules

[57] ABSTRACT

A database system embedded in an operating system command. The system is invoked by operating system commands and uses no system resources except when performing a command. Searching is performed by binary search on a sorted file and sequential search on an unsorted file. New and changed records are appended to the unsorted file and the files are merged whenever the unsorted file becomes too long.

19 Claims, 10 Drawing Sheets

DATABASE MANAGEMENT SYSTEM EMBEDDED IN AN OPERATING SYSTEM COMMAND

BACKGROUND

This invention is generally related to computer database systems and more particularly to a database system that is invoked by means of an operating system command.

Some commands are inherent in the operating system of any computer. Typically, such commands have the advantage of simplicity, ease of entry by the user, and high speed of execution by the computer. However, operating system commands can perform only relatively simple functions and have not been suitable for more complex operations such as managing a database.

Some users require advanced database capabilities that can only be satisfied by, and that justify the relatively high cost of, a commercial database management system. Examples of such commercial database systems are "Paradox" and "dBASE", manufactured by Borland International, and "Access", manufactured by Microsoft Corporation. These commercial systems typically must be running in the background or sometimes even the foreground, demanding computation resources, memory resources and the like from the host computer.

Many computer users do not need the capabilities of a commercial database system. Such users would prefer to avoid the high purchase price of such systems as well as the demands they place on computer system resources. Accordingly, there is a need for a relatively simple and low-cost way to manage a database that uses only simple commands and that does not tie up computer system resources.

SUMMARY OF THE INVENTION

The present invention provides a database management system that is embedded in operating system commands and that takes no system resources except when performing a command.

In a preferred embodiment the system of the invention runs in the UNIX ("UNIX" is a trademark of Unix Laboratories) operating system environment. UNIX commands are used to invoke the various functions of the database. Data are stored in two complementary files: a sorted file and an unsorted file. The sorted file can be searched very rapidly by means of binary search techniques or the like. New or replacement data are added very rapidly by simply appending them to the unsorted file. When there are enough records in the unsorted file, the two files are merged into a new sorted file; this merging operation, referred to herein as "maintaining" the database, is preferably performed when the computer system is not otherwise busy.

Other aspects and advantages of the present invention will become apparent from the following detailed description, taken in conjunction with the accompanying drawings, illustrating by way of example the principles of the invention.

DESCRIPTION OF THE PREFERRED EMBODIMENTS

Figure 1:
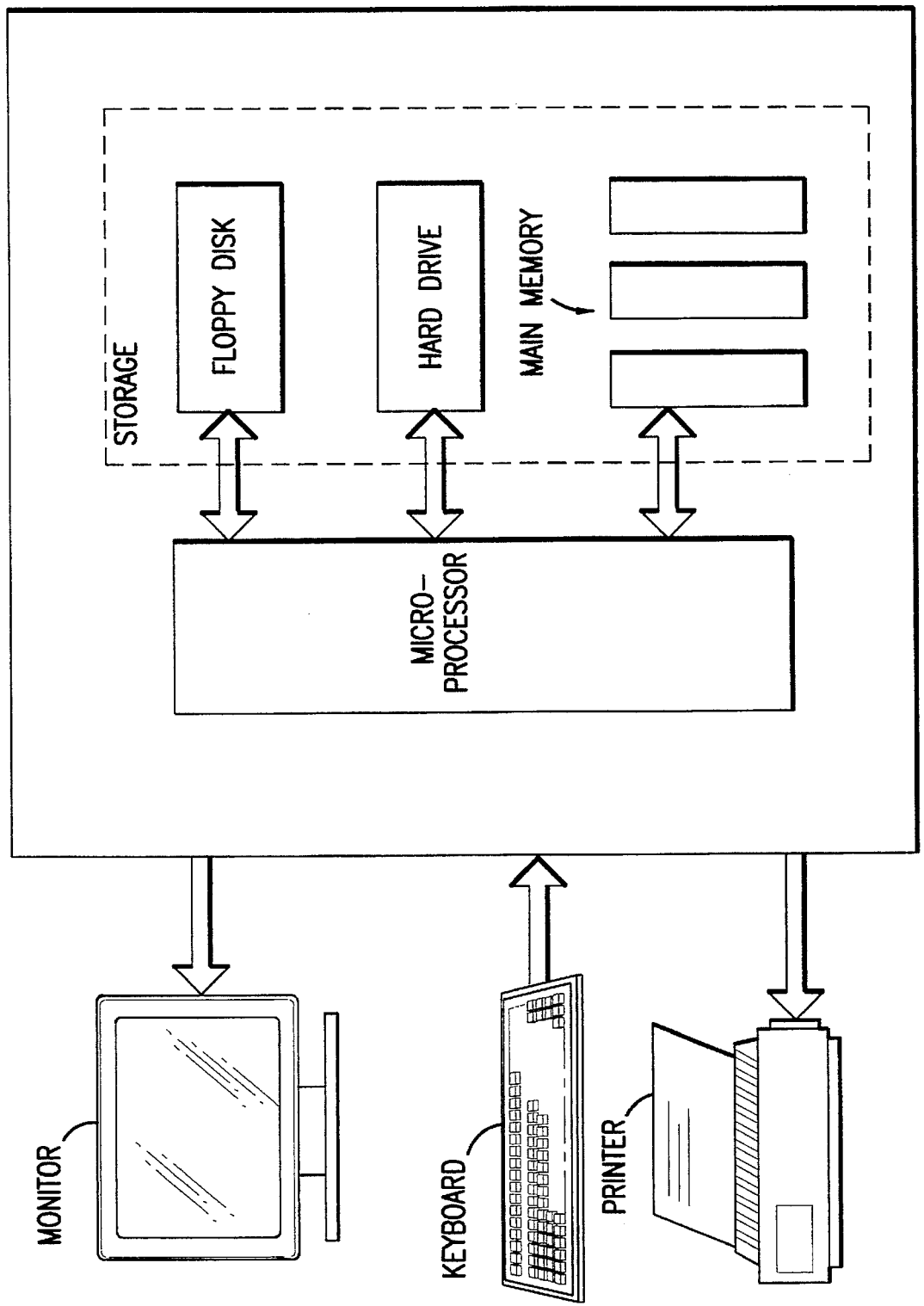
FIG. 1 depicts a computer system of the kind in which the present invention is preferably implemented.
Figure 2:
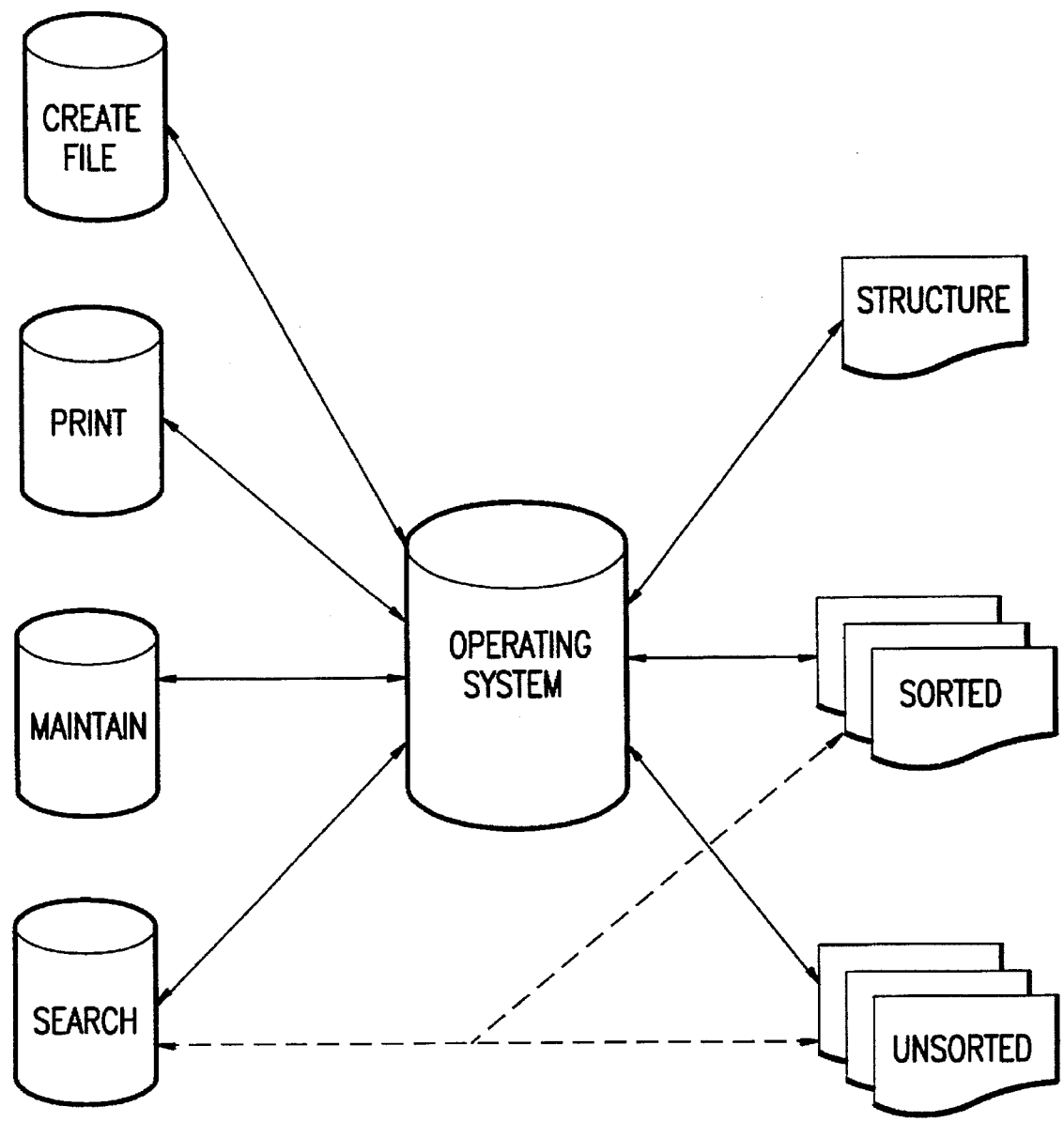
FIG. 2 depicts various programs, code, and data files that are stored in the "storage" portion of the computer shown in FIG. 1.
Figure 3A:
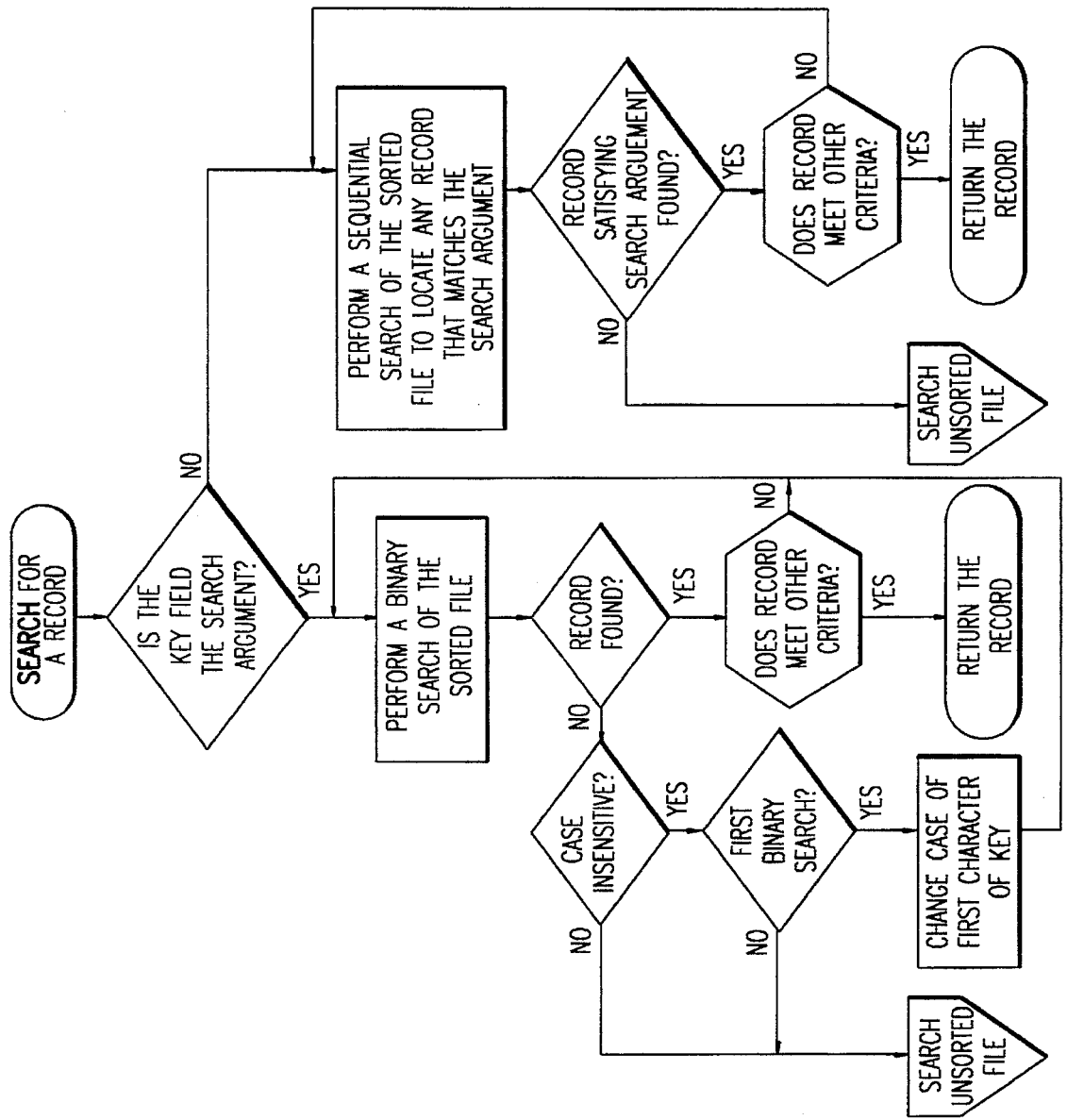
FIGS. 3A and 3B depict the "search" procedure of a database system according to the present invention.
Figure 3B:
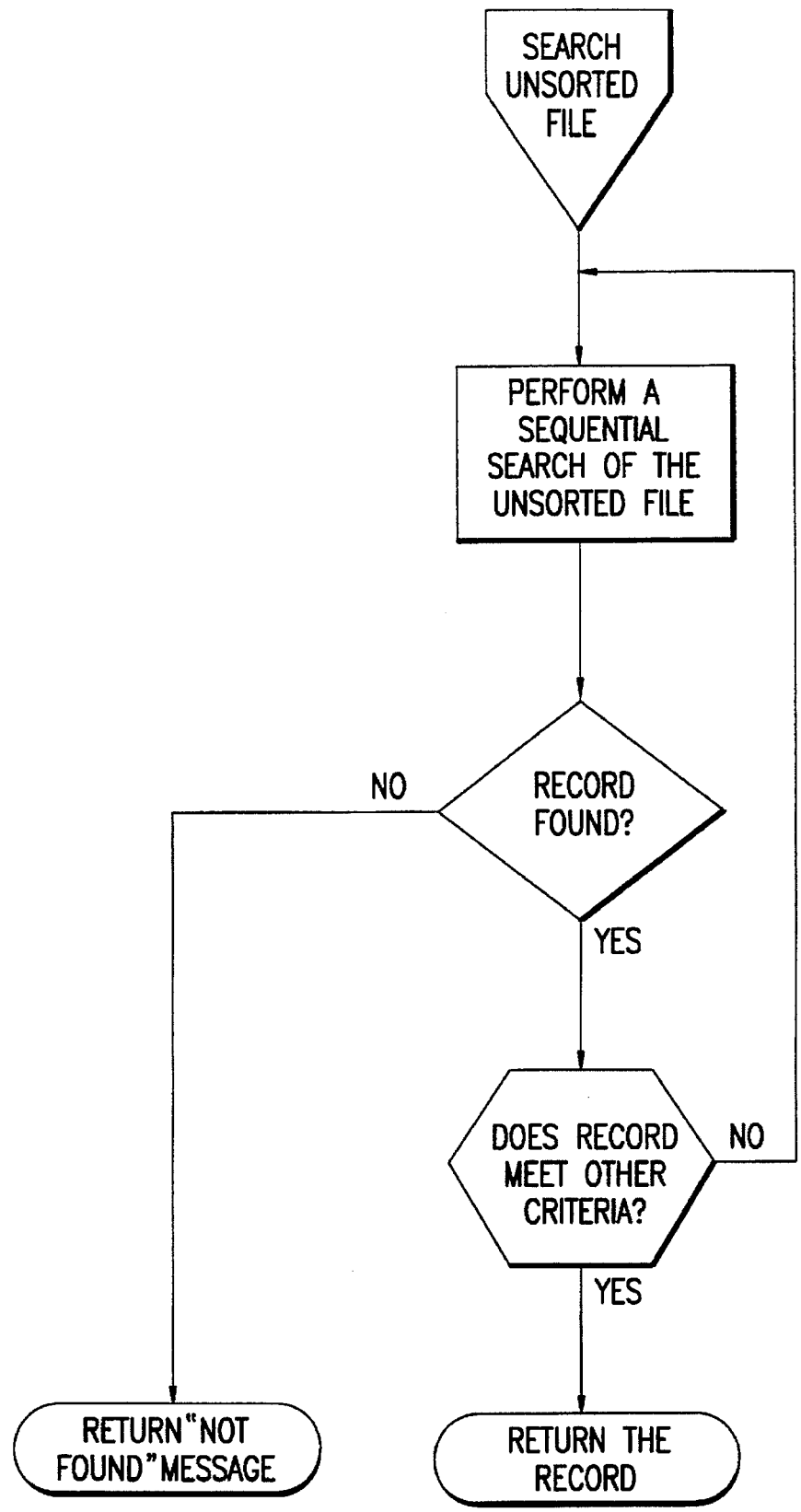
Figure 4:
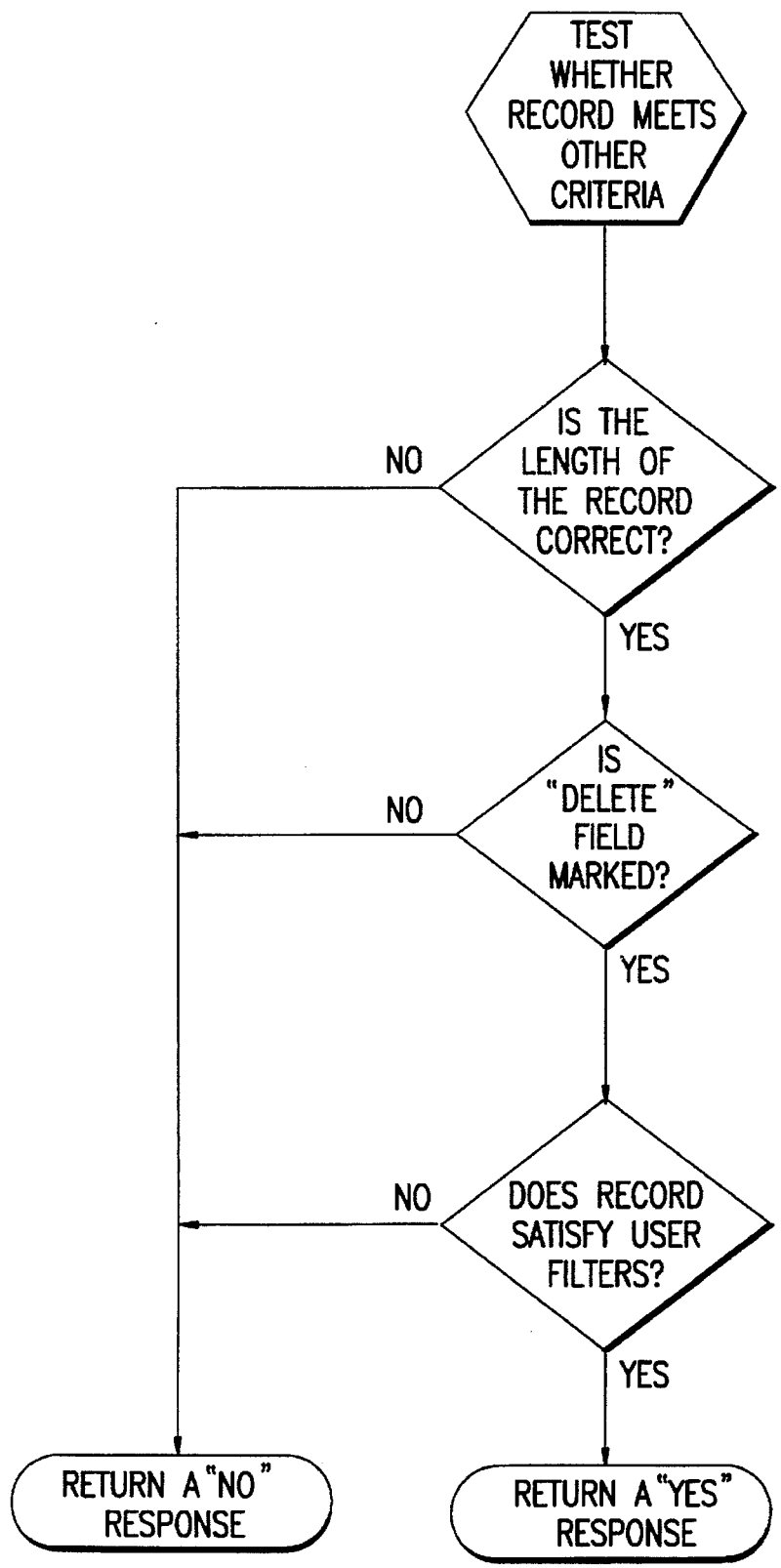
FIG. 4 illustrates the "does record meet other criteria" procedure of FIGS. 3A and 3B.
Figure 5:
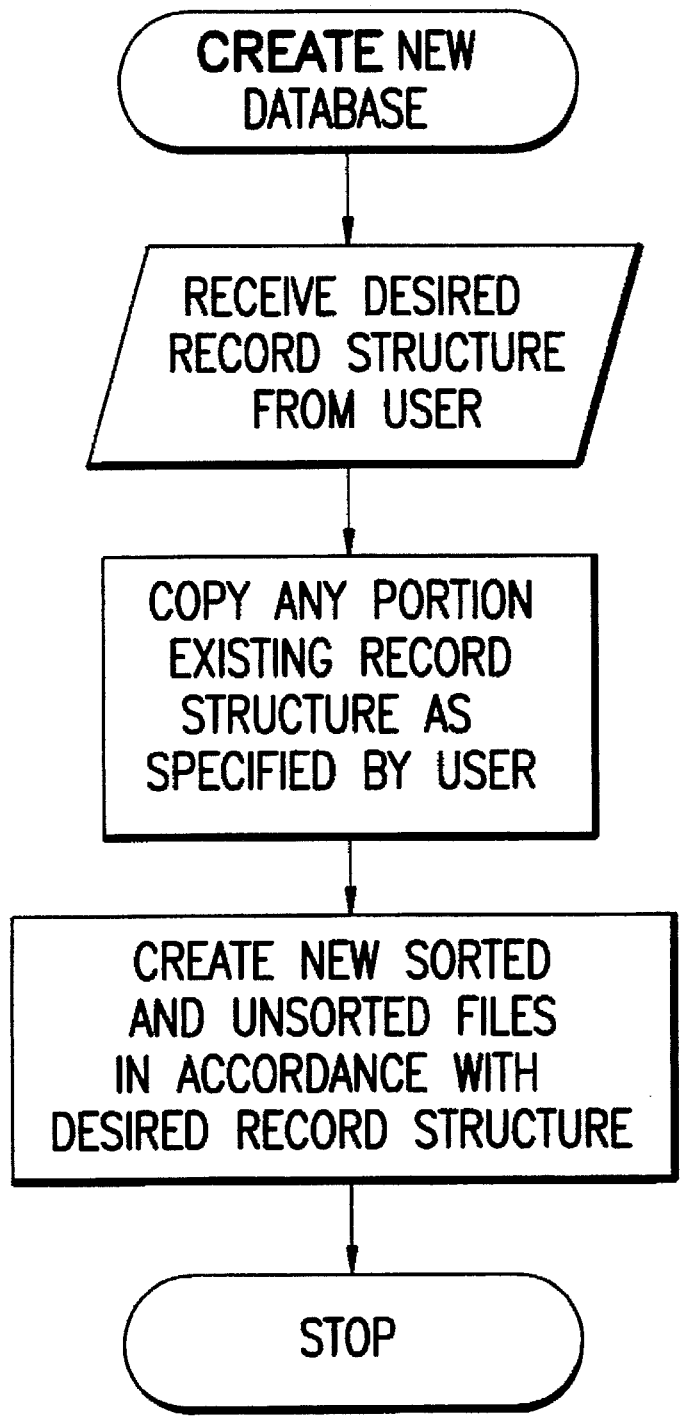
FIG. 5 illustrates the "create new database" procedure of the database system according to the present invention.
Figure 6:
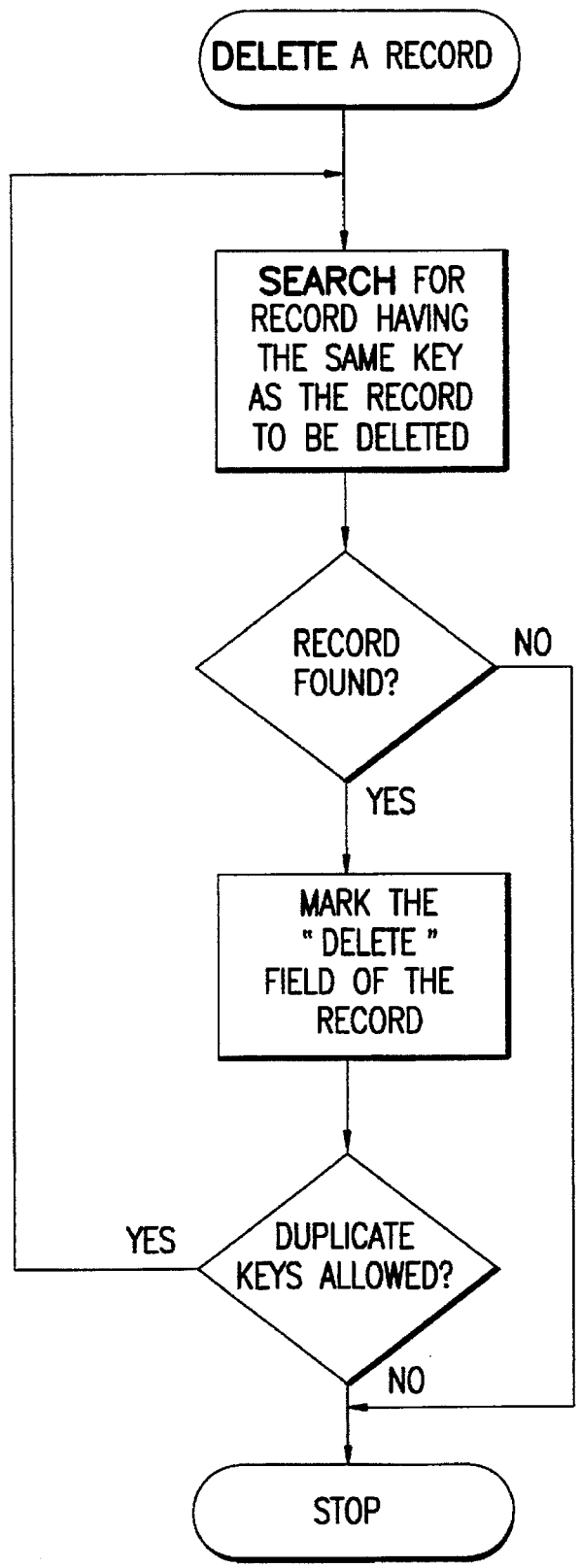
FIG. 6 illustrates the "delete a record" procedure of the database system according to the present invention.
Figure 7:
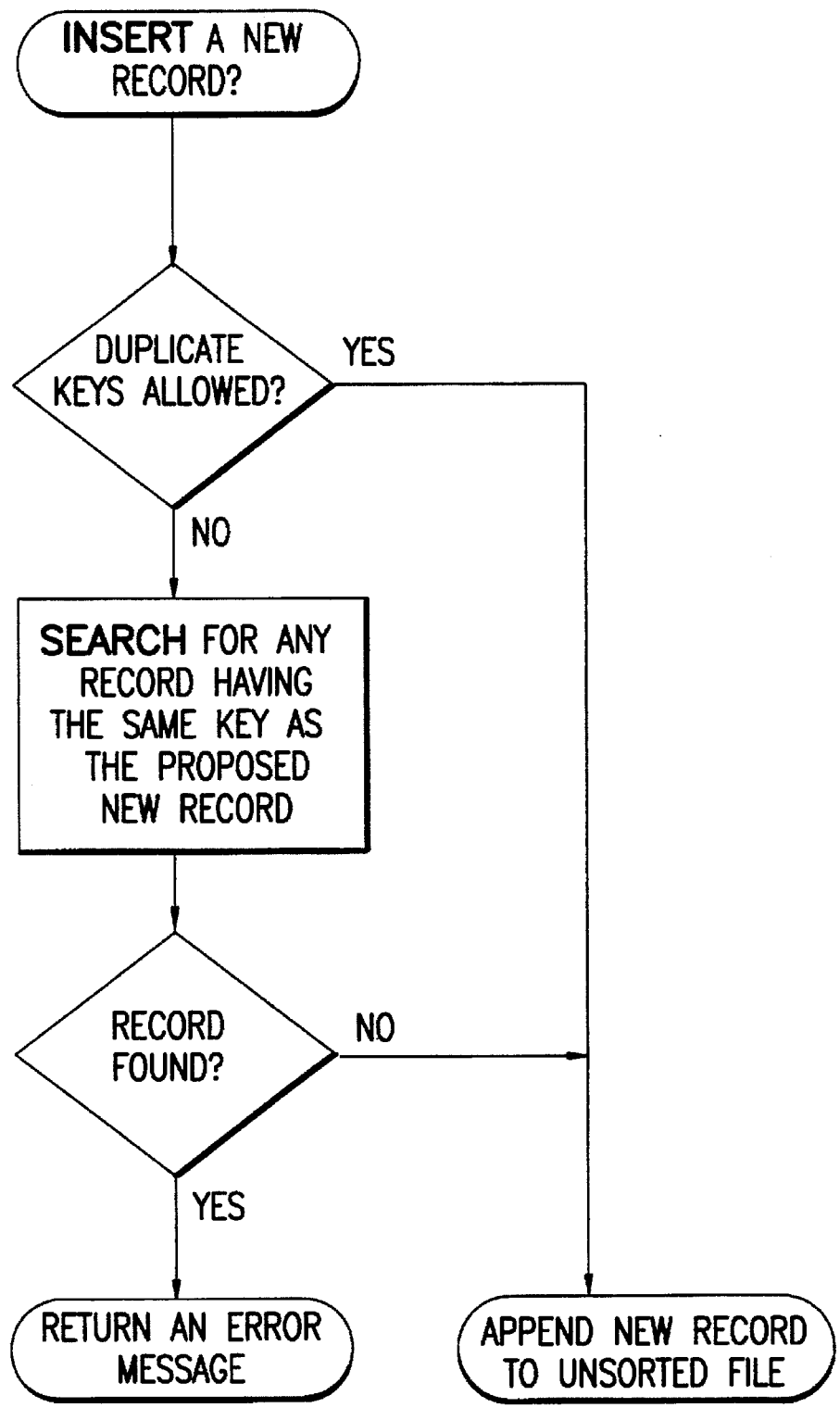
FIG. 7 illustrates the "insert a new record" procedure of the database system according to the present invention.
Figure 8:
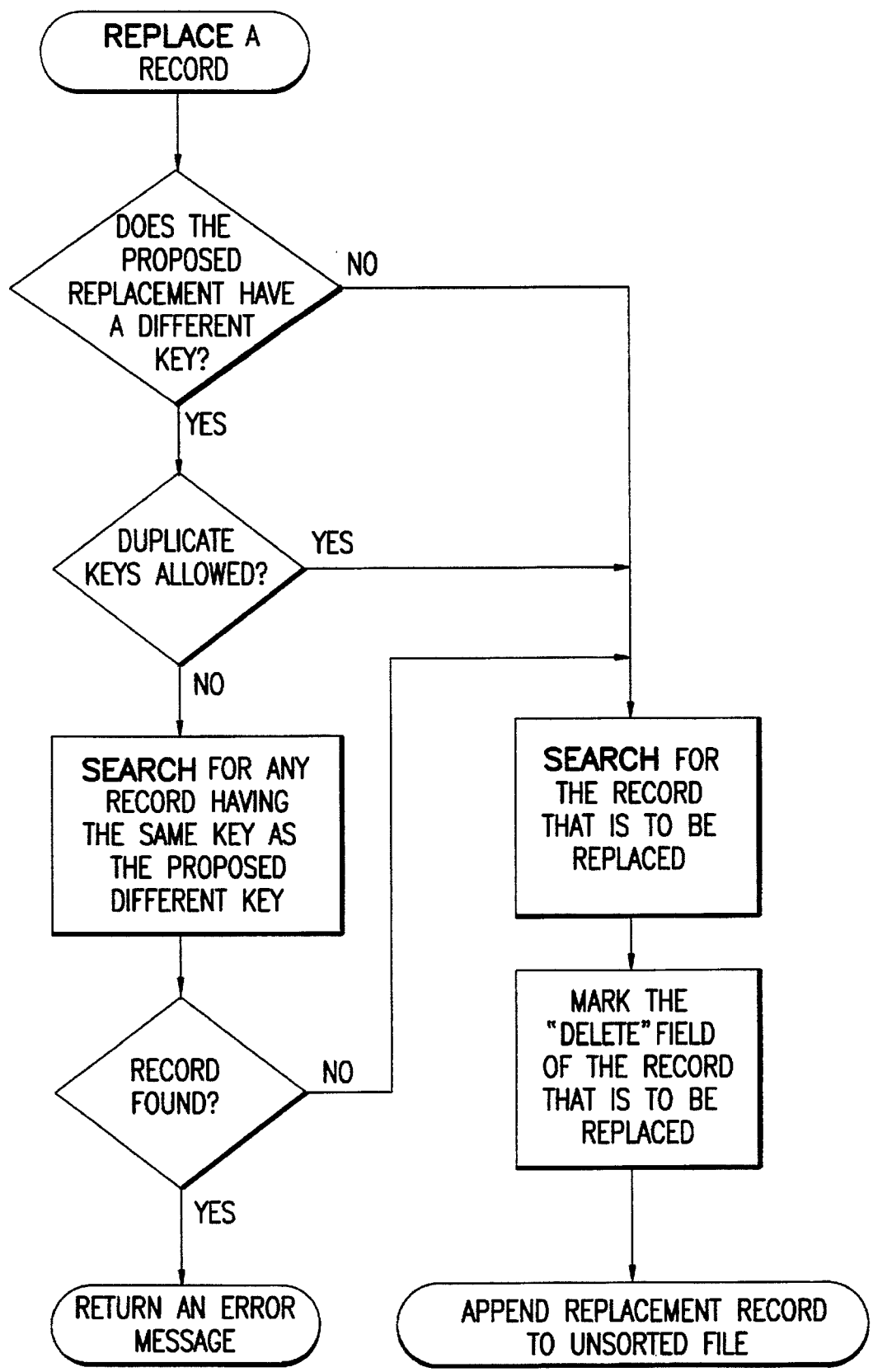
FIG. 8 illustrates the "replace a record" procedure of the database system according to the present invention.
Figures 9, 10:
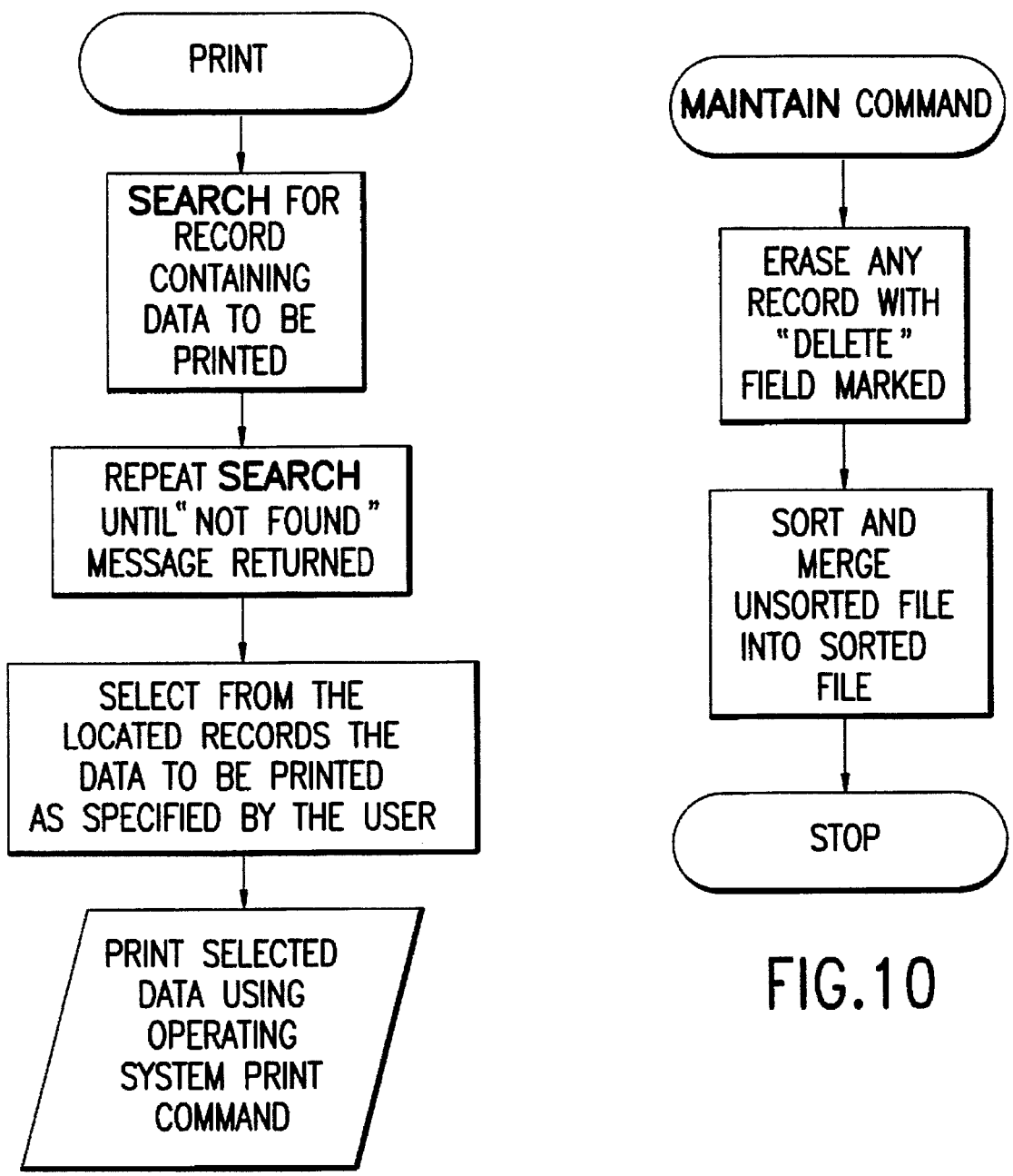
FIG. 9 illustrates the "print" procedure of the database system according to the present invention.
FIG. 10 illustrates the "maintain" command procedure of the database system according to the present invention.

The database management system of the present invention is described as follows. The system is referred to herein by the term "idb", which in the preferred embodiment is also used as the operating system command entered by the user when the user desires to use the database system.

1. General Description of idb

Briefly, idb is designed to act as a bridge between UNIX commands and large databases. In other words, idb is a UNIX command like grep or awk but it performs database operations such as retrieval and manipulation of records.

There are no costs associated with maintaining the files that idb uses. Such files are regular UNIX files that can be created and maintained either by the user or by idb itself. idb uses a record description file, a main data file that contains sorted data, and an auxiliary file that contains unsorted data. idb requires that the main data file be of fixed length to facilitate the use of fast access algorithms. Developing the record descriptor file takes less than five minutes and is accelerated if C struct is available.

Any functionality that is not native to idb can easily be provided to connect idb with other commands. For example, idb has a reporting mechanism that can be piped to commands such as awk to generate sophisticated reports.

Among the strengths of idb are the following: speed (log n) for keyed access; instant usability; zero cost of purchase; zero cost of maintenance; works with standard files (no need for overhead space); wide selection of operators (e.g. =, !=, <, <=, >, >=); special replacement operators (+, +—, +=, —=); field filtering during search; case sensitivity (optional); wild characters; interactive insertion; default values; selective output; sorting; verification of key duplication (optional); partial replacement; networked operation; and minimum training. idb does not offer multiple keys, multiple relations, rollback, or SQL interface, and it has only the char data type. Operations that involve multiple related files are better handled by a commercial database because idb has no relational capability.

2. Design idb was designed to fill the gap between standard UNIX commands (such as cut, grep, tail, and ed) that are not suitable for database applications and commercial database management systems that must be purchased and that require computer resources and significant training of users. Accordingly, the design objectives for idb were (1) typical database functionality, (2) ease of use and (3) natural blending with the UNIX philosophy of operation. As respects the third objective, idb reads data from stdin, sends data to stdout and sends error messages to stderr. idb returns an "exit" status that is consistent with the operations executed. This blending is naturally obtained when the results of idb are piped to other tools to construct more powerful commands.

For speed of operation, idb accesses records through a binary search if the user searches on a key field (a key field is a field on which the records have previously been sorted). This access method is well known and its speed is high and predictable. Binary search offers at least two advantages. First, unlike the hashing method, there is no relation between the speed of the search and the value of the key or the size of the file. Second, unlike the b-tree method, there is no need for a previous reading of the keys.

A drawback of the binary search method is that the records must have been sorted before being searched. This would mean that the file would have to be re-sorted after every insertion or deletion of a record. The time needed to do all this re-sorting would more than offset the advantage of the speed gained by binary searching. To avoid the need to re-sort all the time while still gaining the speed advantage of binary searching, idb maintains an auxiliary file for receiving new records to be inserted. Each search has two phases: a fast access search of the main file using binary search techniques and a sequential search of the auxiliary file. The user can merge the auxiliary file into the main file as desired, which usually would be whenever the auxiliary file becomes larger than some specified maximum.

3. Operation idb is invoked in the same manner as any other UNIX command. All options are specified by parameters in the command line. All "sanity checking" is completed before starting a transaction. One transaction is considered to be the execution of a single command. Before initiating a transaction, idb plans a resource strategy to avoid deadlocks. idb performs multiple transactions of the same kind (e.g. multiple searches or multiple insertions) one file at a time.

idb builds a core image of the description of a file at run time. This allows the interpretation of the same data file from different views. The record descriptor follows the syntactic rules of struct in C. For example, the command

```
idb -f xref -s'*'
``` instructs idb to read a file called xref and to send a list of all records to stdout. The file xref holds the description of the record. This record description could, for example, appear as follows:

```
struct  {
        char man_id      [16];
        char qfd_id      [16];
        char owner       [32];
        char cost        [4];
        char summary          [36]
        } xref_data;
``` where xref_data is the name of the file that contains the actual data. The command

```
idb -f xref -s 'spec*' -i cost>100
``` instructs idb to report any records having a key beginning with spec and having a cost greater than 100.

The above record description might appear differently to a different application. For example, in another application it might be seen as follows:

```
struct  {
        char man_id      [16];
        char qfd_id      [16];
        miscellaneous    [72];
        } xref_data;
```

4. Maintenance

The -m parameter is used to merge the main data file and the auxiliary file. The auxiliary file contains all new records inserted in the database subsequent to the creation of the database or to the last maintenance operation. The auxiliary file has the same name as the main data file, but with a prefix of a dot.

During a maintenance operation, any records that have been marked as "delete" are removed from the main data file. Any records that contain duplicate keys are also removed unless the -x parameter is used. Then the auxiliary file is initialized.

The -m parameter merges the auxiliary file into the main data file unconditionally. A variant, the -M parameter, performs the merge only if a certain number of records have been inserted into the auxiliary data file. For example,

```
idb -f xref -m
``` will merge the main and auxiliary data files unconditionally, whereas the command

```
idb -f xref -M 20
``` will do the merge only if the auxiliary file has more than 20 records.

The -m parameter and the variant -M are positional. If either of these parameters are inserted in the command line before one of these parameters: -a (insertion), -r or -R (replacement), -d (deletion) or -s (search), maintenance is done first and then the operation specified by the other parameter is performed. If the -m or -M parameter is inserted in the command line after one of these other parameters, the operation specified by the other parameter is done first and then maintenance is performed.

With the -m parameter, one can easily dump a file and construct a new one with a different key. For example, if -xref2 has the following description:

```
struct   {
         char composite    [32];
         miscellaneous     [72];
         } xref2_data;
``` then the command

```
idb -f xref -s'*' | idb -f xref2 -a -m
``` tells the first idb to dump the contents of xref2_data to stdout and tells the second idb to collect those data from its stdin and build xfer2_data.

5. A Simple Application

Assume as an example a company that provides telephone directory assistance. A file called directory_data holds data respecting the local residents in the following format:

```
struct   {
         char last_name    [16];
         char first_name   [16];
         char phone        [8];
         char address      [64];
         } directory_data;
```

A value that is too long for a field will be truncated. If a value does not completely fill a field, the remainder of the field is filled with blanks. If a value is not specified at all, the entire field is filled with blanks.

Search Parameter

The simplest command a user can issue in idb is a simple search, such as:

idb -f directory -s'*' which would result in the same list that would be obtained by using the cat command. An example of a few entries in such a list is:

| Aardvark | Bird    | 369-0186 | 110 Meadow Lane      |
| -------- | ------- | -------- | -------------------- |
| Buffalo  | Bill    | 415-8519 | 2310 Prairie Dr      |
| Fox      | Steve   | 857-0100 | 20 Chicken Lane      |
| Turtle   | Elmer   | 964-2131 | 89 Emerald Isle Road |
| Weasel   | Sly     | 237-1015 | 312 Daisy Field Lane |
| Wolf     | Peter   | 674-1541 | 1938 Zoo Road        |
| Wombat   | John B. | 856-3612 | 2400 Tanager Ave     |
| Wombatty | S. K.   | 857-1236 | 2379 Munchkin Street |
| Zebra    | Sam     | 875-8900 | 1635 Sahara Drive    |

If a user wanted to retrieve the listings for all people whose last name starts with the letters "Wo", the command would be:

idb -f directory -s 'Wom*' and the resulting output would be:

| Wombat   | John B. | 856-3612 | 2400 Tanager Ave     |
| -------- | ------- | -------- | -------------------- |
| Wombatty | S. K.   | 857-1236 | 2379 Munchkin Street |

But if the user only wanted the last name and phone number, the command would be:

idb -f directory -s 'Wo*' -i last_name -i phone and the resulting output would be:

| Wombat   | 856-3612 |
| -------- | -------- |
| Wombatty | 857-1236 |

If the same search were run, but with the further condition of retrieving only those having a prefix of 857, the command would be:

idb -f directory -s 'Wo*' -i "phone:857*" -i last_name -i phone and the resulting output would be

| Fox    | 857-0100 |
| ------ | -------- |
| Wombat | 857-1236 |

In the latter example the -i parameter was used three times. The first appearance filters the search and the second and third appearances tell idb that the output should consist of the values of the last_name and phone fields separated by a blank. idb sends the output to stdout unless some other destination is specified. Quotation marks were used around the expression phone:857* to prevent the shell from interpreting the asterisk character.

Insert Parameter

There are several ways that records can be inserted. A raw record, for example only a last name and a phone number, is inserted by the following command:

idb -f directory -s 'Flamingo         857-2035' -a which does not include a first name or an address. idb will fill the "first name" and "address" fields with blanks.

Items can be separated by delimiters, where a delimiter is just a metastring (that is, not part of the actual data), by the following command, where ~ is the delimiter:

idb -f directory -s 'Gull~Albert~723-3412~958 Catalina Lane' -a -D~

Delimiters may also be used to insert a partial listing, such as the listing of the preceding example, as follows:

idb -f directory -s 'Flamingo~~~857-2035' -a -D~ which as before will result in the "first name" and "address" fields containing blanks.

If it is desired to enter a partial listing with the data in a different order than the order of the fields in the record structure, the following command can be used:

idb of directory -s '857-2035~Flamingo' -a -D~ -i phone -i last_name

If it is desired to enter a record interactively, the command idb -f directory -a -v will result in the following prompt, in which the length of each field is displayed graphically:

last_name?...

first_name?...

phone?...

address?...

A partial record can be entered interactively by specifying in the command parameter which fields are to be entered:

idb -f directory -a -v -i phone-i last_name

In response to the preceding command, idb will prompt for only the phone number and last name. The value of one field can be specified in the command line while idb prompts for other fields. For example, the command:

idb -f directory -a -v -i phone -i last_name -i first_name:MARY will insert the name "MARY" into the first_name field and will prompt the user for the values of the phone and last_name fields.

Records can be copied out of one file, for example my_file, for insertion into another file, for example directory, by the following command:

cat my_file | idb -f directory -a or idb-f directory-a < my_file

And a filter can be used to copy only certain records from one file to another. For example, if it is desired to copy only records in which the last name starts with "S", the following command would be used:

cat my_file | grep "S*" | idb -f directory -a

If only certain fields were to be copied, for example only last_name and phone, the following command would be used:

```
cat my_file | idb -f directory -a -i last_name -i phone
``` in which case the first_name and address fields in directory would be filled with blanks.

Replacement Parameter

Replacement mode is similar to insertion mode. The simplest example is to change the value of one field in a record. For instance, in the telephone directory listing, to change Mr. Aardvark's first name from "Bird" to "Fowl", the following command would be used:

```
idb -f directory -s Aardvark -R first_name:Fowl
```

More than one replacement can be done in one command; a plurality of replacements are evaluated left-to-right.

A record can be entirely replaced with a different record. For example, to replace Mr. Aardvark's listing with a new listing for Mr. Jim Giraffe of 900 Tower Lane, the following command would be used:

```
idb -f directory -s Aardvark
  -r 'Giraffe    Jim       968-7203 900 Tower Lane'
```

Delimiters can also be used, to avoid having to indicate blank spaces, as previously described.

Fields can be replaced in different order than they appear in the record structure. For example, to change the phone number and first name of Mr. Aardvark from 369-0186 to 321-7347 and from Bird to Fowl, respectively, the following command may be used:

```
idb -f directory -s Aardvark-r '321-7347~Fowl' -a -D~-R phone
  -R first_name
```

Delete Parameter

The -d parameter deletes all records found by the search argument. For example, the command

```
idb -f directory -s Aardvark -d
``` deletes Mr. Aardvark and his phone and address from the directory.

Case Insensitive Parameter

The -c parameter instructs idb to disregard case. For example, the command:

```
idb -f directory -s 'aardvark' -c
``` would return all of the following records:

| Aardvark  | Bird | 369-0186 | 110 Meadow Lane   |
| AARDVARK  | Sam  | 368-9075 | 220 Green Street  |
| aardvark  | Tom  | 456-7890 | 8527 Memory Drive | whereas the command:

```
idb -f directory -s 'aardvark'
``` would return only the record:

```
aardvark Tom 456-7890 8527 Memory Drive
```

When specifying case insensitivity, it is necessary for idb to perform two binary searches of a file, one search per case of the initial character of the field being searched. This is because upper and lower case instances of the same letter are represented differently, and will appear in different locations within a file that has been sorted on that field. There may be two distinct groups of records within this sorted file, one group having all of the records beginning with the uppercase letter and the other having all of the records beginning with the lowercase letter.

Thus, in the above example, there may be one or more intervening record between the AARDVARK record and the aardvark record. In such an event, the first binary search will find the record group containing the Aardvark and the AARDVARK records, but will not find the aardvark record. The second search will then be required to find the aardvark record.

It is also possible that a binary search will find a record other than the first record in a group. In the previous example, it may be that the first binary search will find the AARDVARK record rather than finding the Aardvark record. Thus, when the binary search finds a record, it will push the record into a stack. Then, idb will perform a backwards serial search looking for those records that match the search argument and push them into the stack. The backwards serial search ends when no more records match the search argument or when the loop reaches the beginning of the file. It will then be possible to pop the stack to return the record on top of the stack. That is, in the previous example, the Aardvark record. This procedure will also be performed in instances where duplication of keys is permitted.

Horizontal Expand Parameter

The layout of records is seldom stable over time. The -y parameter allows the dynamic expansion of the file either by enlarging the size of a field or by introducing a new field. For example, to make a new entry in the above telephone directory in which the value of phone must include international dialing codes and extensions, the -y parameter can be added to an insert command as follows:

```
idb -f directory -s 'Poodle~Jacques~011-36-3-20-10-56-42-
  89x1235~77 Rue du Cologne, Paris' -a -D~ -y
```

In this example, the -y parameter will expand the phone field from 8 to 28 characters throughout the file and will modify the file description to indicate that the phone field has 28 characters.

The -Y parameter is similar to the -y parameter except that -Y allows for either expansion or contraction of a field.

Using the -y parameter to add new fields will be discussed in a subsequent paragraph.

Retrieving a Record That Matches a Condition

The -o parameter is used anytime it is desired to process only one record at a time, for example in a loop. If it is desired, say, to send a letter to all persons having an 837 prefix to their phone numbers, the following Korn Shell script could be used, including the -o parameter:

```
x=1
while user=`idb -f directory -s '837-*' -o $x`
  do
    send_a_letter $user
    ((x=x+1))
  done
```

The variable x will take the values 1, 2, 3, . . . and idb will return the first, second, third . . . record that satisfies the condition -s '837=*'.

Remote Access

If the filename following the -f parameter includes the '@' character, idb will assume that the characters following the @ are the name of a remote host and idb will execute a remote shell on the remote host, using the parameters in the command line. For example, in response to the command:

idb -f desc@remote -s '*'>result idb will execute a search on the system named remote and will leave the output of the search in the file titled result.

Creation of a New Database

Appropriate parameters may be used to cause idb to create a new file description and database. For example, the user may cause idb to use contents of an existing file called passwd to create the following file description:

```
struct   {
         char login [8];        /* offset = 0 */
         char pwd [13];         /* offset = 8 */
         char uid [3];          /* offset = 21 */
         char gid [4];          /* offset = 24 */
         char misc [27];        /* offset = 28 */
         char home [21];        /* offset = 55 */
         char shell [20];       /* offset = 76 */
         } passwd_data         /* record len = 96 + 1 */
``` by means of the following command:

idb -f passwd -i login -i pwd -i uid -i gid -i misc -i home -i shell -a -y -D: -m<passwd where the parameters have the following meanings:

| | |
|---|---|
| -a | a record is being added |
| -i | description of a field |
| -y | create undeclared fields |
| -D: | data will be delimited by the colon |
| -m | perform maintenance after the transaction has been completed | and stdin is redirected to read from/etc/passwd. Of course, the same result could have been obtained by piping the contents of/std/passwd into idb.

The user may use cat and idb to create a database called group out of the fields titled group and gid from the file passwd by means of the following command:

cat group | cut -f1,32 -d: | idb -f group -i group -i gid -a -y -D: -m which results in the following data file:

| | |
|---|---|
| adm | 4 |
| atm | 21 |
| bin | 2 |
| daemon | 5 |
| guest | 1044 |
| lp | 7 |
| mail | 6 |
| other | 1 |
| root | 0 |
| scaff | 24 |
| sys | 3 |
| users | 20 |
| wizard | 10 |

The two databases described above may be joined by selecting those gid's in passwd that are not referenced in group by the following commands:

idb -f passwd -s '*' -i login -I gid -D: >from_passwd idb -f group -s '*' -i group -I gid -D: >from_group join -1 2 -2 2 -a 2 -t: from_passwd from_group | grep -v '.*:.*:.*' where the parameters of the join command mean to take the second field from both files (1 and 2); produce a line of output for each unpairable line in the file from_group in addition to the normal output; and use the character ":" as a separator. The parameter -v of the grep command means to print all lines but those that match the pattern ".*:.*:.*". The idb parameters have the following meanings: -s means that the search argument is the wild-card character "*"; the -i parameter without an argument means that what is wanted is only the fields login and gid, not the raw record; the -I parameter is similar to -i except that the output is to be sorted by gid. The result of the above three commands is the following output:

| | |
|---|---|
| 0 | :root |
| 1 | :other |
| 10 | :wizard |
| 21 | :atm |
| 6 | :mail | which means that the groups named in the output have no counterparts in passwd.

The following command will replace the shell of all the users that belong to the groups 4 or 20 with the default shell/bin/ksh:

idb -f passwd -s '*' -i gid:20 -I gid:4 -R shelh/bin/ksh where the -i parameter performs a logical AND to the search argument * and the paramenter -I performs a logical OR.

The following command adds a new record interactively:

idb -f passwd -a -v idb will prompt the user with the name of the field followed by a number of dots corresponding with the length of the field:

login?. . .

pdw?. . .

uid?. . .

gid?. . .

misc?. . .

home?. . .

shell?. . .

Entering <CNTL/D> in the first field login will stop the prompting. Entering <CNTL/D> in any other field will prompt for the previous field. If the -s parameter is not present in the command line, idb will assume that the new record(s) come from stdin. For example, in the command:

idb -f passwd -a idb prompts the user with a question mark if stdin is a terminal, or idb assumes that the record(s) come from either a file or a pipe. An example of this is:

idb-f passwd-a <input cat input | grep "r*" | idb -f passwd -a

The following command will expand a data file to create a new field:

idb -f passwd -s '*' -y -m -i new_field:xxxx

The -i parameter with the -y parameter instructs idb to add new_field to the file description and to expand the entire data file with four characters (the length of the string xxxx). idb will generate a new descriptor with new_field appended to the existing list of fields. In the case of the above file structure, the result will be:

```
struct    {
          char login [8];         /* offset = 0 */
          char pwd [13];          /* offset = 8 */
          char uid [3];           /* offset = 21 */
          char gid [4];           /* offset = 24 */
          char misc [27];         /* offset = 28 */
          char home [21];         /* offset = 55 */
          char shell [20];        /* offset = 76 */
          char new_field [4];     /* offset = 96 */
          } passwd_data           /* record len = 100 + 1 */
```

Although a specific embodiment of the invention has been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

We claim:

1. A machine comprising:

a computer; and a computer operating system directing the computer, the computer operating system having a database management system, including database search and maintenance means, responsive to a single operating system command provided by a user, the database search and maintenance means planning a resource strategy to avoid deadlocks prior to executing the single operating system command, if the single operating system command is concatenated with a "search" parameter, the database search and maintenance means to search a sorted file to locate a record having a user-specified value in any field selected by a user, the sorted file including a plurality of records sorted according to data contained in a key field of each record, the key field being specified in a structure file that defines a structure for the records, the structure including the key field and at least one other field, if no such record is located in the sorted file when the single operating system command is concatenated with a "search" parameter, then the database search and maintenance means to search an unsorted file to locate a record having the value in the field, the unsorted file being for receiving records from the user, the database search and maintenance means responsive to the single operating system command concatenated with a "maintenance" parameter provided by the user to sort and merge unsorted file records into the sorted file.

2. A machine as in claim 1 wherein the database search and maintenance means is responsive to the operating system command concatenated with an "expand" parameter provided by the user to change the structure associated with the sorted file and perform dynamic expansion of the sorted file.

3. A machine as set forth in claim 2 wherein a new field is added to the structure file by the database search and maintenance means when the user provides the single operating system command concatenated with the "expand" parameter.

4. A machine as set forth in claim 2 wherein an existing field is removed from the structure file by the database search and maintenance means when the user provides the single operating system command concatenated with the "expand" parameter.

5. A machine as set forth in claim 2 wherein an existing field size is changed in the structure file by the database search and maintenance means when the user provides the single operating system command concatenated with the "expand" parameter.

6. A machine as set forth in claim 5 wherein the existing field size is decreased in the structure file by the database search and maintenance means when the user provides the single operating system command concatenated with the "expand" parameter.

7. A machine as set forth in claim 5 wherein the existing field size is increased in the structure file by the database search and maintenance means when the user provides the single operating system command concatenated with the "expand" parameter.

8. The machine as in claim 1 wherein the database search and maintenance means is responsive to the operating system command concatenated with an "input" parameter provided by the user to prompt the user for values according to the structure associated with the sorted file when adding a new record to the unsorted file.

9. A machine as in claim 1 wherein the database search and maintenance means searches the sorted file by means of a binary search if the sorted file has previously been sorted on the field selected by the user and by means of a sequential search if the sorted file has not previously been sorted on the field selected by the user.

10. A machine as in claim 1 wherein the database search and maintenance means is responsive to the single operating system command concatenated with a "case-insensitive" parameter provided by the user to perform a first binary key field search of the sorted file and then perform a second binary key field search of the sorted file using a different case for the user-specified value.

11. A machine as in claim 10 wherein if the user provides the single operating system command concatenated with a "case-insensitive" parameter to the database search and maintenance means and a matching record is found during the first or second binary key field search, at least one record in the sorted file adjacent to the matching record is examined.

12. A machine as in claim 1 wherein the database search and maintenance means is responsive to said operating system command concatenated with a "print" parameter provided by the user to print data stored in the sorted and unsorted files according to said parameter.

13. A machine as in claim 1 wherein the database search and maintenance means is responsive to the single operating system command concatenated with a "new data" parameter provided by the user to append a record containing new data supplied by the user to the unsorted file.

14. A machine as in claim 1 wherein the database search and maintenance means is responsive to the single operating system command concatenated with a "corrected data" parameter provided by the user to locate a record that contains an uncorrected version of data, mark the located record for deletion, and append a record containing a corrected version of the data to the unsorted file.

15. A machine as in claim 1 wherein the database search and maintenance means is responsive to the single operating system command concatenated with a "record structure" parameter provided by the user to create a sorted file and an unsorted file adapted for receiving records that are structured in accordance with said record structure parameter.

16. A machine as in claim 1 wherein the "search parameter" can include a wild-card designator to specify that only a portion of a search field need match.

17. A machine as in claim 1 wherein the database search and maintenance means is responsive to the single operating system command concatenated with a "duplicate permitted" parameter provided by the user to cause the unsorted file to be searched when a record is located in the sorted file and the single operating system command is concatenated with a "search" parameter.

18. A computer-readable memory that can be used to direct a computer to provide a computerized database management system when used by the computer, the computer-readable memory comprising:

a structure file that defines a structure for records, the structure including a key field and a plurality of other fields;

a sorted file that includes a first plurality of records sorted according to data contained in the key field of each record;

an unsorted file for receiving records from a user; and database search and maintenance means, responsive to a single operating system command concatenated with a "search" parameter provided by a user to search the sorted file to locate a record having a user-specified value in any field selected by the user and if no such record is located then to search the unsorted file to locate a record having the value in the field, and responsive to the single operating system command concatenated with a "maintenance" parameter provided by the user to sort and merge unsorted file records into the sorted, the database search and maintenance means planning a resource strategy to avoid deadlocks prior to executing the single operating system command.

19. A process to be performed on a computer, the process comprising the following steps:

a user providing a single operating system command to a computer operating system; and the computer operating system directing the computer, the computer operating system having a database management system, including database search and maintenance means, responsive to the single operating system command provided by the user, the database search and maintenance means planning a resource strategy to avoid deadlocks prior to executing the single operating system command, if the single operating system command is concatenated with a "search" parameter, the database search and maintenance means searching a sorted file to locate a record having a user-specified value in any field selected by a user, the sorted file including a plurality of records sorted according to data contained in a key field of each record, the key field being specified in a structure file that defines a structure for the records, the structure including the key field and at least one other field, if no such record is located in the sorted file when the single operating system command is concatenated with a "search" parameter, then the database search and maintenance means searching an unsorted file to locate a record having the value in the field, the unsorted file being for receiving records from the user, if the single operating system command is concatenated with a "maintenance" parameter, the database search and maintenance means sorting and merging unsorted file records into the sorted file.

* * * * *